(12) United States Patent
Soehnlen et al.

(10) Patent No.: US 11,338,958 B2
(45) Date of Patent: *May 24, 2022

(54) CONVERTIBLE PALLET WITH SELECTIVELY ACTUATED ROLLING FEATURE

(71) Applicant: CREATIVE EDGE DESIGN GROUP LTD., Canton, OH (US)

(72) Inventors: Gregory M. Soehnlen, North Canton, OH (US); Alexander Campana, Lorain, OH (US)

(73) Assignee: Michigan Milk Producers Association, Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,869

(22) Filed: Mar. 30, 2020

(65) Prior Publication Data

US 2020/0317401 A1 Oct. 8, 2020

Related U.S. Application Data

(63) Continuation of application No. 16/236,923, filed on Dec. 31, 2018, now Pat. No. 10,604,299.

(Continued)

(51) Int. Cl.
| | |
|---|---|
| *B65D 19/42* | (2006.01) |
| *B65D 19/00* | (2006.01) |
| *B62B 3/02* | (2006.01) |
| *B62B 5/00* | (2006.01) |

(52) U.S. Cl.
CPC .............. *B65D 19/42* (2013.01); *B62B 3/02* (2013.01); *B62B 5/0093* (2013.01);
(Continued)

(58) Field of Classification Search
CPC ................. B65D 19/42; B65D 2519/00781; B62B 3/02; B62B 5/0083; B62B 2206/006; B62B 2301/05
See application file for complete search history.

(56) References Cited

U.S. PATENT DOCUMENTS

| | | | | |
|---|---|---|---|---|
| 8,511,693 B2 * | 8/2013 | Gass | .................... | B25H 1/04 |
| | | | | 280/43.17 |
| 8,888,110 B2 * | 11/2014 | Sadeh | ................ | B65D 19/0026 |
| | | | | 280/43.14 |

(Continued)

*Primary Examiner* — Daniel J Rohrhoff
(74) *Attorney, Agent, or Firm* — Fay Sharpe LLP (57) ABSTRACT

A convertible pallet assembly, and associated method of making the convertible pallet, includes a first, planar pallet surface, and a second, planar support surface spaced therefrom. First and second sidewalls extend in parallel relation between the pallet surface and the support surface from adjacent opposite sides thereof. The sidewalls include first and second wheels with respective rotational axes that extend perpendicular to the sidewalls. An actuation mechanism is associated with each sidewall. The actuation mechanism has (i) a first position that allows the first and second wheels on one side to move upwardly and downwardly relative to the sidewall in a non-load carrying condition, and (ii) a second position such that the first and second wheels on the one side project outwardly from the support surface in a load carrying condition whereby the assembly can be rolled on the wheels as a cart.

14 Claims, 10 Drawing Sheets

Related U.S. Application Data (60) Provisional application No. 62/612,223, filed on Dec. 29, 2017.

(52) U.S. Cl.
CPC .... *B65D 19/0024* (2013.01); *B62B 2206/006* (2013.01); *B62B 2301/05* (2013.01); *B65D 2519/00273* (2013.01); *B65D 2519/00293* (2013.01); *B65D 2519/00323* (2013.01); *B65D 2519/00781* (2013.01)

(56) References Cited

U.S. PATENT DOCUMENTS

| | | | |
|---|---|---|---|
| 9,950,726 B2* | 4/2018 | Thompson | B65D 19/42 |
| 10,220,868 B1* | 3/2019 | Clos | B64F 1/322 |
| 10,604,299 B1* | 3/2020 | Soehnlen | B65D 19/0024 |
| 2007/0186827 A1* | 8/2007 | Loftus | B65D 19/42 |
| | | | 108/57.15 |
| 2009/0236809 A1* | 9/2009 | Carver | B62B 5/0093 |
| | | | 280/43.12 |
| 2010/0187782 A1* | 7/2010 | Facey | B62B 5/0093 |
| | | | 280/30 |
| 2012/0024329 A1* | 2/2012 | Ma | B62B 3/02 |
| | | | 135/16 |
| 2013/0119623 A1* | 5/2013 | Sadeh | B65D 19/0026 |
| | | | 280/30 |
| 2013/0119624 A1* | 5/2013 | Stubbs | B62B 3/02 |
| | | | 280/30 |
| 2013/0121800 A1* | 5/2013 | Hacko | B65D 19/0026 |
| | | | 414/800 |

* cited by examiner

CONVERTIBLE PALLET WITH SELECTIVELY ACTUATED ROLLING FEATURE

This application is a continuation application of U.S. Ser. No. 16/236,923, filed Dec. 31, 2018, claiming the priority benefit of U.S. Provisional Application Ser. No. 62/612,223, filed Dec. 29, 2017 and relates to commonly owned, co-pending U.S. application Ser. No. 15/323,190, filed Jul. 6, 2015, the entire disclosures of which are incorporated herein by reference.

BACKGROUND

It is well known to use a pallet that receives product on an upper, pallet surface thereof. When the product is moved from one location to another, associated equipment is used to lift and/or move the loaded pallet. For example, the pallet includes openings dimensioned to receive arms of a lift assembly such as a forklift or pallet jack whereby the arms are inserted into the openings, the entire pallet raised and supported by the arms, and the mobile forklift/pallet jack used to move the pallet and product to a desired end location where the pallet is lowered so that the load imposed by the product on the pallet is transferred from the pallet to the end location.

As shown and described in the '190 application, one common way to now transport fluid containers such as bottled milk is to place the filled bottles without crates in a stacked array on the pallet. It is difficult, however, to move a fully loaded pallet through a store due to the footprint of a full pallet. As a result, many retail stores do not use motorized forklifts because of the size, noise, and odor associated with using a forklift in a store environment. Likewise, lifting and transporting loaded pallets with the pallet jack still does not overcome the size constraint issue.

Consequently, bottled milk is unloaded in a back room of the store from the pallet and on to a bossy—a frame-like structure having two or more caster wheels for ease of movement in the store. Because the bossy has a smaller footprint than a pallet, the bossy is preferred to transport bottled milk through the store, but usually requires more than one trip to transport all of the bottled milk from the back of the store to the display case. Undesired costs are thus encountered in connection with, for example, (i) the labor required to transfer the product (e.g. milk bottles) from the pallet to the bossy, and subsequently from the bossy to the display case, and (ii) there are additional costs associated with the purchase and upkeep of bossies.

The convertible pallet shown and described in the '190 application addresses at least some of these issues. It has been realized that minimizing the width of a convertible pallet is an important consideration due to standard door sizes through which the pallet must be transported. That is, it is important to address the size (i.e., width) of the convertible pallet since existing doors are less likely to be altered. Further, simplification of the structure that achieves a conversion from a stationary to a movable pallet is also desirable while still providing for a pallet that can (i) easily roll on a flat surface without the assistance of the associated lift equipment and (ii) accommodate well-known lift equipment such as forklifts or pallet jacks.

A need exists for an improved arrangement that addresses at least one or more of the above-described problems of prior arrangements while advantageously maintaining desired benefits of prior devices, as well as achieving still other features and benefits.

SUMMARY

An improved convertible pallet is provided.

A convertible pallet assembly in one preferred embodiment includes a first, planar pallet surface, and a second, planar support surface spaced therefrom. First and second sidewalls extend between the pallet surface and the support surface from adjacent opposite sides thereof, the sidewalls are disposed in parallel relation to one another and each sidewall includes at least first and second wheels with respective rotational axes that extend perpendicular to the sidewalls. An actuation mechanism is operatively associated with each sidewall. The actuation mechanism has (i) a first position that allows the first and second wheels on one side to move upwardly and downwardly relative to the sidewall in a non-load carrying condition, and (ii) a second position such that the first and second wheels on the one side project outwardly from the support surface in a load carrying condition whereby the assembly can be rolled on the wheels as a cart.

In a preferred arrangement, the first and second wheels of the first sidewall are interconnected and thereby move together upwardly and downwardly relative to the first sidewall.

The first and second wheels of the second sidewall are likewise interconnected and thereby move together upwardly and downwardly relative to the second sidewall.

In a preferred arrangement, the first and second wheels of the second sidewall move upwardly and downwardly independent of the first and second wheels of the first sidewall.

The pallet surface and the support surface are spaced apart by a predetermined dimension adapted to receive associated arms of an associated pallet jack or associated forklift.

The actuating mechanism preferably includes an interconnecting member joining the first and second wheels on each side.

The interconnecting member in one arrangement is configured to slide fore and aft relative to the respective sidewall.

The interconnecting member is configured to slide upwardly and downwardly relative to the support surface.

The interconnecting member includes at least one raised surface (load carrying blocks) extends outwardly therefrom and selectively engages a projecting surface (abutment surfaces) operatively associated with the pallet surface, the raised surface and the projecting surface spaced from one another in the first position of the actuating mechanism, and abutting one another in the second position of the actuating mechanism and transferring load from the pallet surface to the support surface through the abutting components.

A recess preferably receives the raised surface in the first position of the actuating mechanism.

Each actuating mechanism preferably includes a cam and a follower that is interposed between the pallet surface and the first and second wheels.

The cam is provided on one of the pallet surface and the sidewall, and the follower is provided on the interconnecting member.

The cam in one preferred arrangement is a face cam having a generally L-shaped slot formed by first and second portions in which the first portion extends in a direction between the pallet surface and the support surface, and the second portion extends in a direction generally parallel to the support surface.

The cam surface preferably further includes first and second detents at distal ends of the first portion and second portion, respectively, of the cam slot.

Each sidewall may include first and second wall portions forming a cavity therebetween that receive the first and second wheels on a respective side.

A method of making a convertible pallet assembly is also disclosed herein. The method includes providing a first, planar pallet surface and providing a second, planar support surface. The method includes joining the pallet surface to the support surface with first and second sidewalls extending therebetween, wherein each sidewall includes at least first and second wheels, and moving the first and second wheels between (i) a first position that allows the first and second wheels on one side to move upwardly and downwardly relative to the sidewall in a non-load carrying condition, and (ii) a second position such that the first and second wheels on the one side project outwardly from the support surface in a load carrying condition whereby the assembly can be rolled on the wheels as a cart.

A primary benefit of the convertible pallet is the ease with which the pallet is converted from being stationary to being mobile or movable, and vice versa.

Another advantage resides in conforming the convertible pallet to existing doorway widths, standardized lift assemblies, i.e. forklifts and pallet jacks.

Yet another benefit is the ability to easily manufacture the convertible pallet assembly.

Still other benefits and advantages of the present disclosure will become more apparent from reading and understanding the following detailed description.

BRIEF DESCRIPTION OF THE DRAWINGS

FIG. 19 is taken along the lines D-D of FIG. 16; and FIG. 18 is taken along the lines E-E of FIG. 16).

DETAILED DESCRIPTION

FIGS. 1-9 show a convertible pallet or pallet assembly 100 that includes a first, substantially planar pallet surface 102 (shown here as a series of parallel planar boards) and a second, planar support surface 104. The first and second surfaces 102, 104 or held in spaced relation by first and second sidewalls 106, 108. Intermediate walls joins or spacers 110, 112 are disposed in parallel relation to the first and second sidewalls 106, 108. Particularly, the intermediate walls/spacers 110, 112 provide increased strength and rigidity between the pallet surface 102 and the support surface 104. Further, the intermediate spacers 110, 112 are shown as being equally-spaced between the first and second sidewalls 106, 108, specifically defining openings 120, 122 that extend from a first end 130 to a second end 132 of the pallet assembly 100. The openings 120, 122 are dimensioned to receive arms of the lift assembly (shown and described below in connection with FIGS. 11 and 12). It will be appreciated that the intermediate walls/spacers 110, 112 need not be equally spaced between the first and second sidewalls 106, 108; however, it is important that the openings 120, 122 be located and dimensioned to receive the arms of an associated lift assembly.

Figure 1:
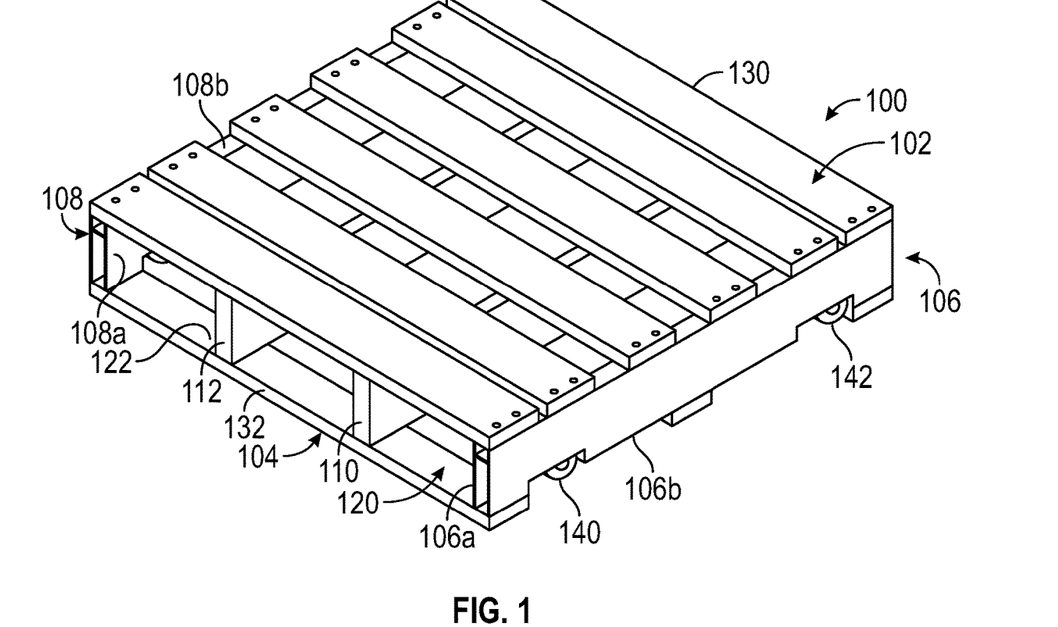
FIG. 1 is a perspective view of a convertible pallet in accordance with the present disclosure.
Figure 2:
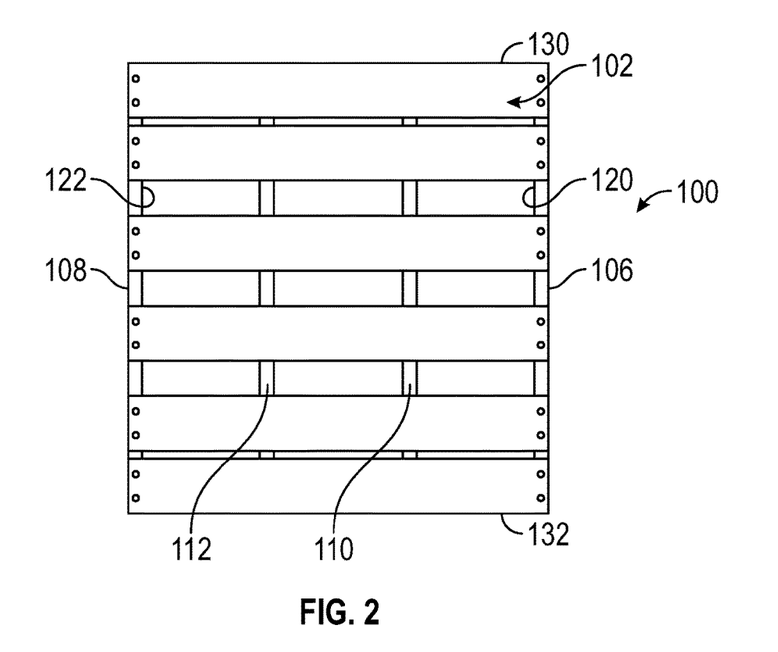
FIG. 2 is a top plan view of the convertible pallet of FIG. 1.
Figure 3:
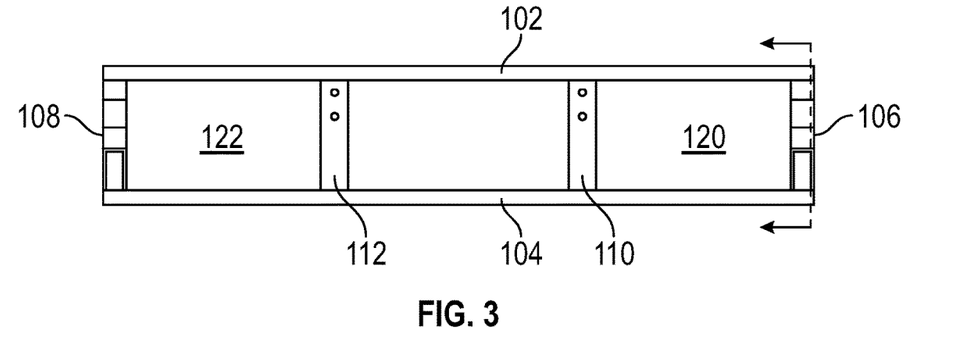
FIG. 3 is an elevational view of a first end (left-hand end) of the convertible pallet of FIG. 1.

With continued reference to FIGS. 1-3, more particular details of the first and second sidewalls 106, 108 are shown in FIGS. 4-7. The description of one side wall is applicable to the other unless noted otherwise and thus description of the first sidewall 106 and the associated reference numerals apply to the second sidewall 108. Sidewall 106 is an assembly that includes an inner sidewall portion 106*a* and an outer sidewall portion 106*b*. The sidewall portions 106*a*, 106*b* define a cavity therebetween. Disposed within the cavity are first and second wheels or rollers 140, 142 that rotate about respective axes 144 that are parallel to the planar pallet surface 102 and the planar support surface 104. An interconnecting member 146 joins the first and second wheels 140, 142 so that the wheels of one sidewall assembly move together upwardly and downwardly, and fore and aft, relative to the sidewall portions 106*a*, 106*b*. It will be further appreciated that the wheels on one side (e.g., first sidewall 106) of the pallet assembly 100 can move independently of the first and second wheels 140, 142 on the other (second) sidewall 108.

An actuating mechanism 150 is operatively associated with each sidewall 106, 108. A cam 152 forms a part of the actuating mechanism 150 and, as shown, in a preferred arrangement is fixedly secured to one of the pallet surface 102 and/or the sidewall. The cam 152 can adopt a wide variety of configurations but in this particular instance operates like a face cam in which a generally L-shaped slot 154 includes a vertical, first portion 156 and a horizontal, second portion 158. Thus the first portion 156 of the slot 154 generally extends in a direction between the pallet surface 102 and the support surface 104. On the other hand, the second portion 158 of the slot 154 generally extends in a direction parallel to the pallet surface 102 and the support surface 104. The slot 154 includes detents 160, 162 at respective distal ends of the first and second portions 156, 158 of the slot 154, and proximal ends of the first and second portions intersect to form the L-shape of the slot.

Figure 4:
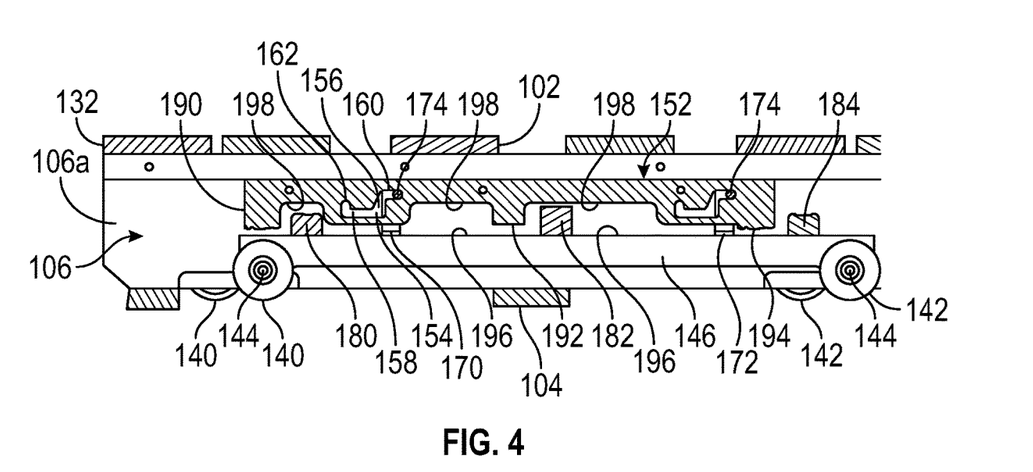
FIG. 4 is an enlarged elevational view of a first side of the convertible pallet of FIG. 1 with an outer sidewall removed for ease of illustration, and first and second wheels of the first sidewall shown in a non-load carrying condition.
Figure 5:
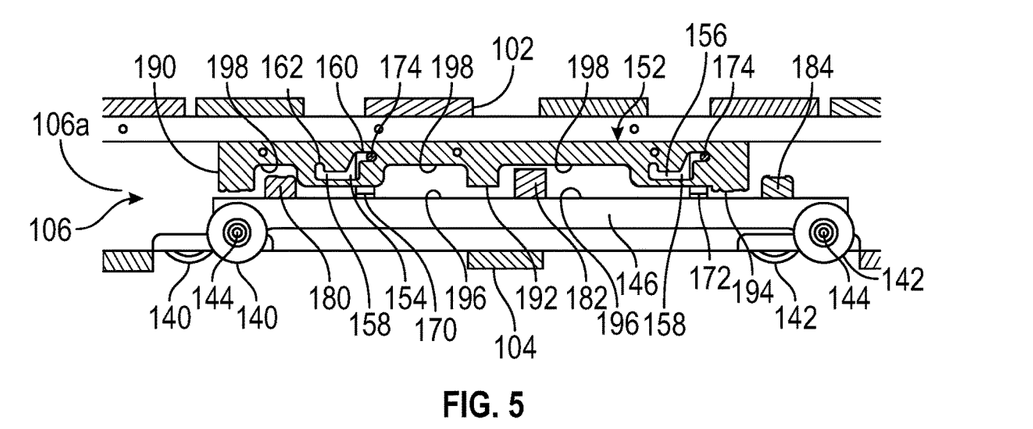
FIG. 5 is an enlarged elevational view similar to FIG. 4 with the pin slightly raised into the top of the vertical portion of the cam slot.
Figure 6:
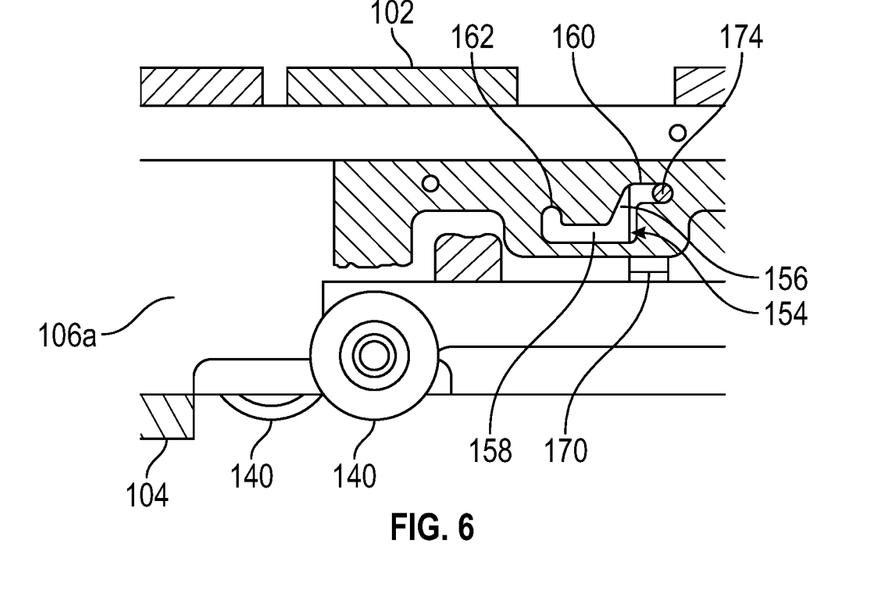
FIG. 6 is a further enlarged view of the actuating mechanism in a non-load carrying condition.
Figure 7:
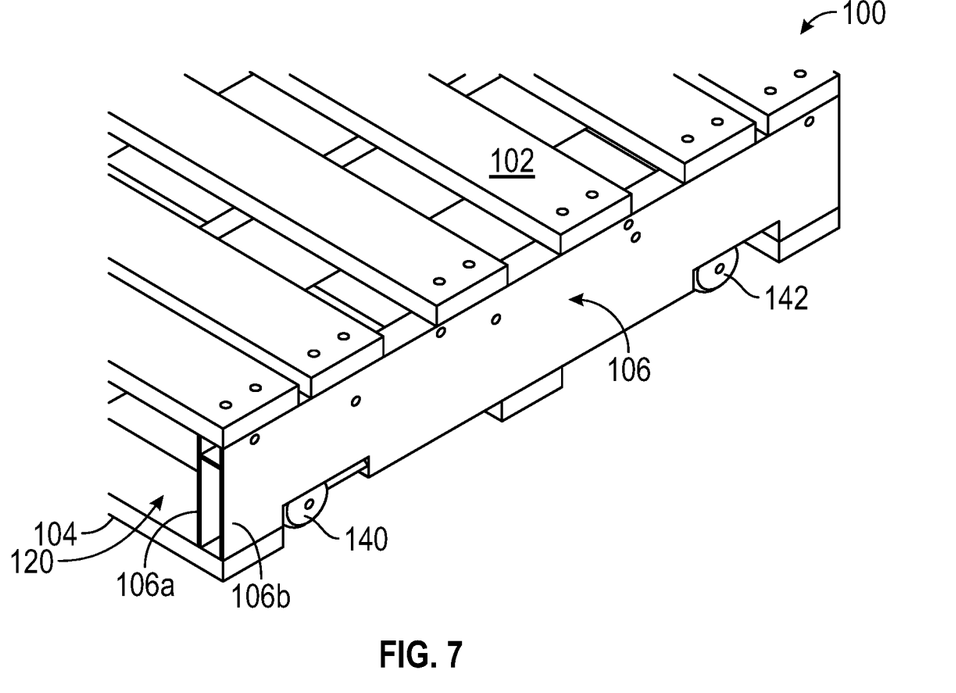
FIG. 7 is a perspective view of a portion of the convertible pallet with the first and second wheels of the first sidewall shown in a load carrying condition.
Figure 8:
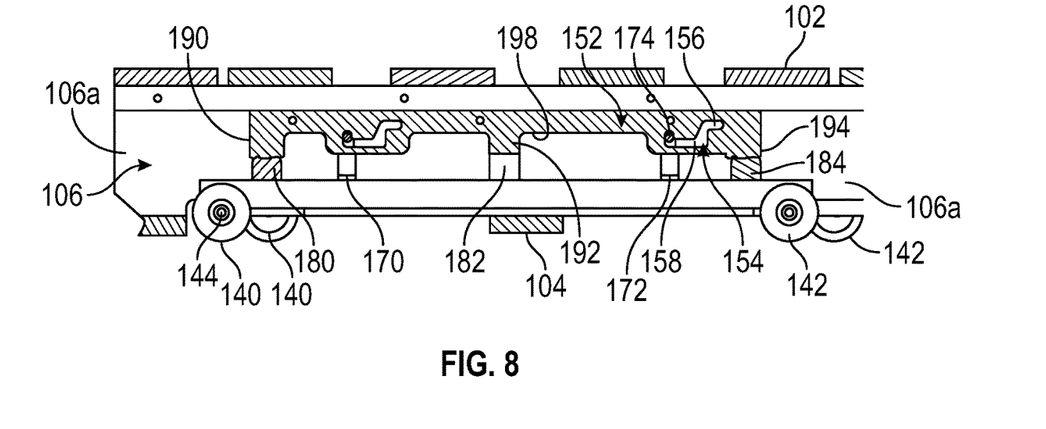
FIG. 8 is an elevational view of the first side of the convertible pallet of FIG. 1 with the outer sidewall removed for ease of illustration, and the first and second wheels of the first sidewall shown in the load carrying condition.
Figure 9:
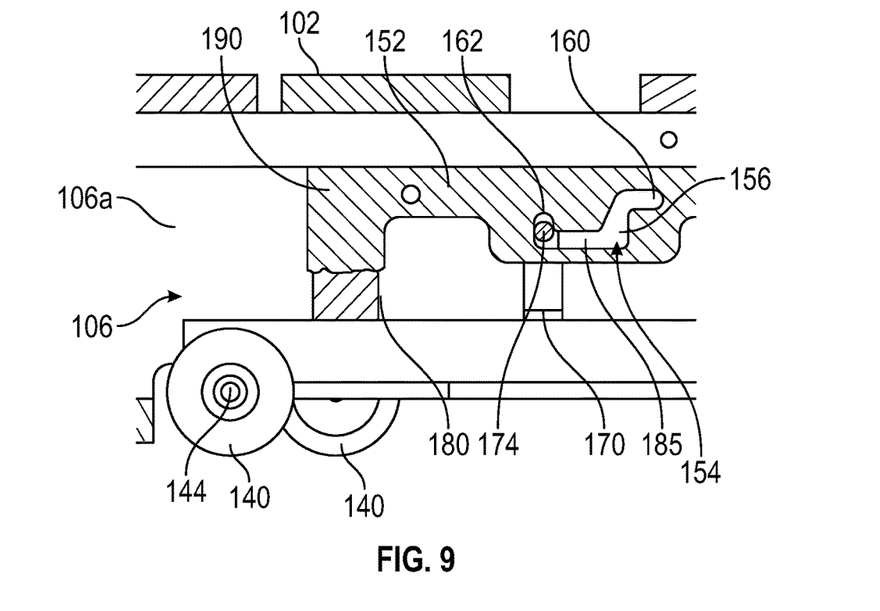
FIG. 9 is a further enlarged view of the actuating mechanism in a load carrying condition.

A comparison of FIGS. 4-6 with FIGS. 8-9 illustrates how followers 170, 172 are secured for movement with the interconnecting member 146 that joins the first and second wheels 140, 142. A pin or roller 174 is provided, for example, at the end of each of the followers 170, 172 for movement within the slot 154. Thus, as illustrated in FIGS. 4-6, the pins 174 are located in detents 160 of the vertically extending slot portions 156 of slots 154. This positions the interconnecting member 146 and wheels 142, 144 in a first position (a non-load carrying condition) whereby the first and second wheels are recessed relative to the lower surface of the support surface 104. Thus as shown in FIGS. 4-6, the wheels 140, 142 are disposed upwardly and rightwardly relative to the cam 152. If the pins 174 are located in the vertical, first slot portions 156, the first and second wheels are in a load carrying position. That is, the wheels 140, 142 may not be withdrawn from the lower surface of the support surface 104, but no load is passed through the wheels and the load on the pallet surface 102 is conveyed through the sidewalls 106, 108 to the support surface 104 in the same manner as a conventional pallet.

On the other hand, and as best illustrated in FIGS. 8-9, when the pins 174 are received in the second slot portions 158 of the slots 154 (including being received in the detents 162 of the slot second portion 158), wheels 140, 142 are disposed downwardly and leftwardly relative to the cam 152. This orients the first and second wheels 140, 142 to extend below the lower surface of the support surface 104 (also referred to as the second position of the actuation mechanism) where the wheels are in a load carrying condition and the pallet assembly can be rolled on the wheels as a cart.

To further support the first and second wheels 140, 142 and effectively transfer load when the wheels are in the second position or load carrying condition, at least one raised surface (shown here as three horizontally spaced load carrying blocks 180, 182, 184) extend(s) upwardly from the interconnecting member 146 and selectively cooperates (engage or abut) with a respective projecting surface(s) (shown here as three horizontally spaced abutment surfaces 190, 192, 194) that extend(s) downwardly from the cam 150 that is secured to an underside of the pallet surface 102. The particular number of raised surfaces 180, 182, 184 and projecting surfaces 190, 192, 194 may vary, and likewise the location of these surfaces may vary as will be appreciated by one skilled in the art. Further, one or more recesses 196 are then preferably situated between the raised surfaces 180, 182, 184, and similarly one or more recesses 198 are preferably situated between the projecting surfaces 190, 192, 194 so that the load carrying blocks do not abut with the abutment surfaces in the first position (non-load carrying condition) of the actuation mechanism. Instead, the load carrying blocks 180, 182, 184 are received in the recesses 198, and the abutment surfaces 190, 192, 194 are received in the recesses 196.

Consequently, when the pins 174 are received in the vertical portions 156 of the L-shaped slots 154, the wheels 140, 142 can freely move upwardly and downwardly in the non-load carrying condition. However, when the pins 174 are received in the horizontal portions 158 of the L-shaped slots 154, the first and second wheels 140, 142 are constrained from vertical movement and thus establish the load carrying condition. Preferably, the pins 174 are received in the detent 162 of the second slot portions 158, the load carrying blocks are aligned with the abutment surfaces. Advancement of the pins 174 to either one of the detents 160, 162 is preferred in order to retain the actuation mechanism in the desired first position (non-load carrying condition) or the second position (load carrying condition) as desired.

Figure 10:
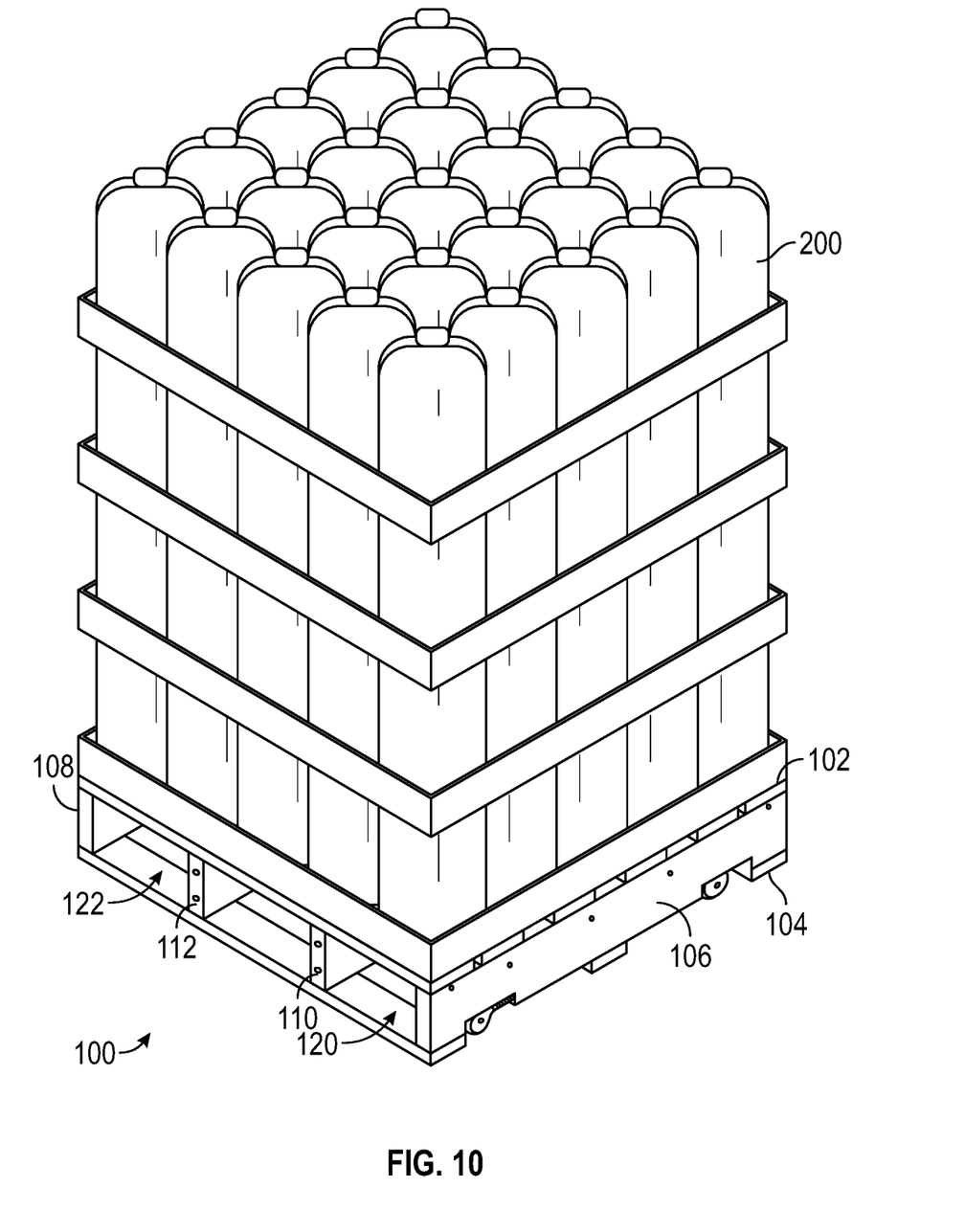
FIG. 10 is a perspective view of a loaded convertible pallet with the wheels thereof in the load carrying condition.

FIG. 10 shows a fully loaded pallet 100. Disposed on the pallet surface 102 is a stacked array of product 200, shown here as filled milk bottles in a stacked columnar array of four rows (the particular array or the particular product carried on the pallet forming no part of the present invention). The wheels 140, 142 are disposed in a load carrying condition so that the convertible pallet 100 with the milk bottles 200 stacked thereon can be rolled over the ground surface.

Figure 11:
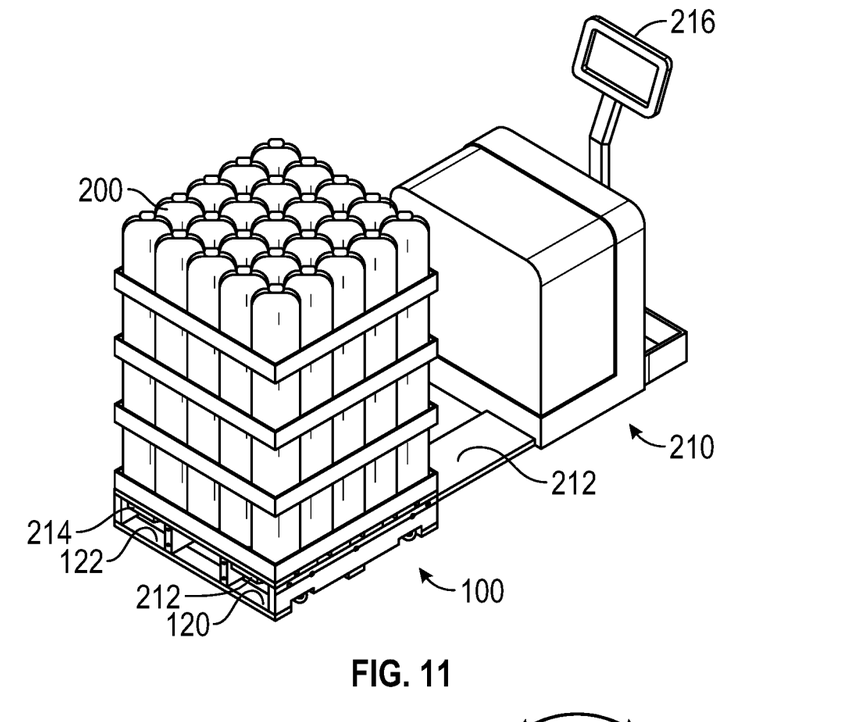
FIG. 11 illustrates initial receipt of arms of a pallet jack received through the convertible pallet.
Figure 12:
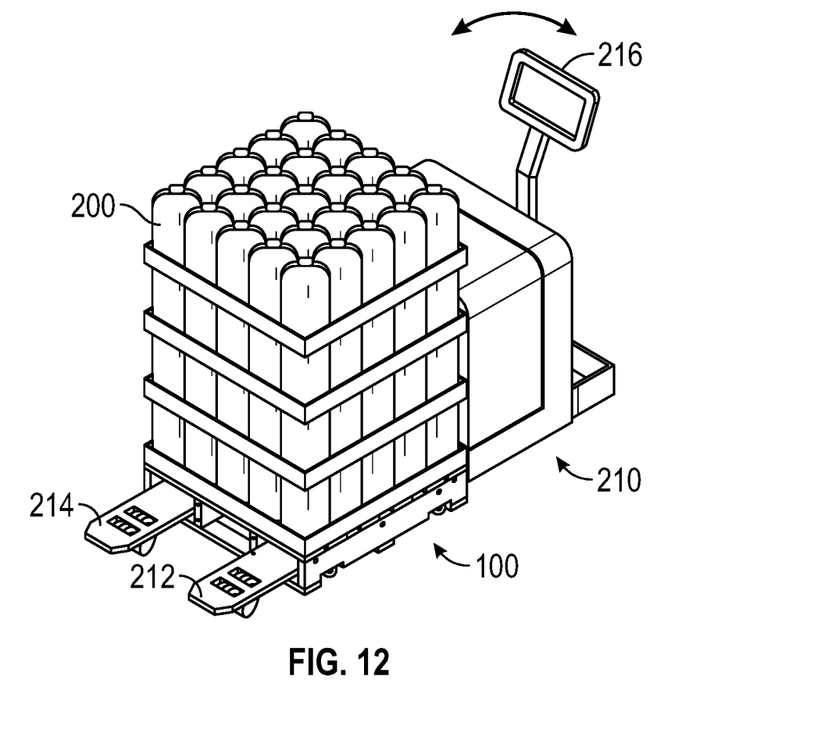
FIG. 12 shows for receipt of the pallet jack arms through the convertible pallet.
Figure 13:
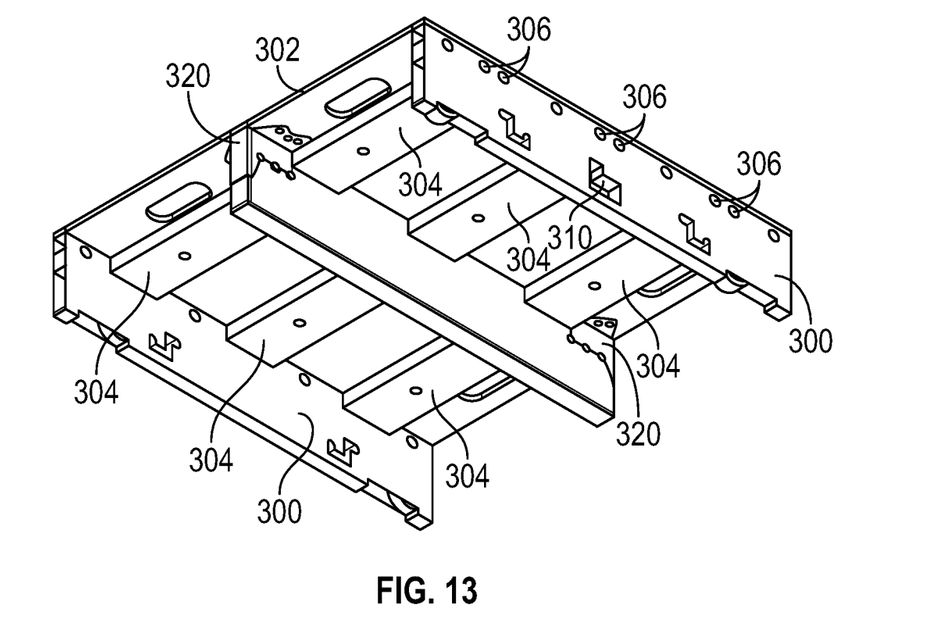
FIGS. 13-20 illustrate select modifications to the convertible pallet (FIG. 17 is taken along the lines A-A of FIG. 16, FIG. 15 is taken along the lines B-B of FIG. 16.
Figure 14:
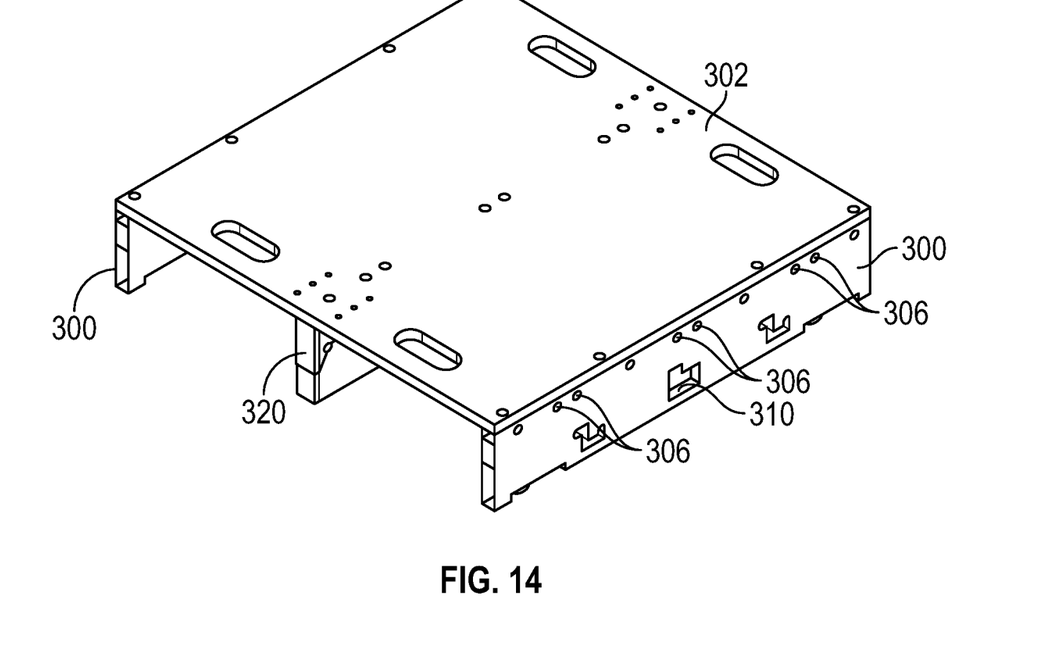
Figure 15:
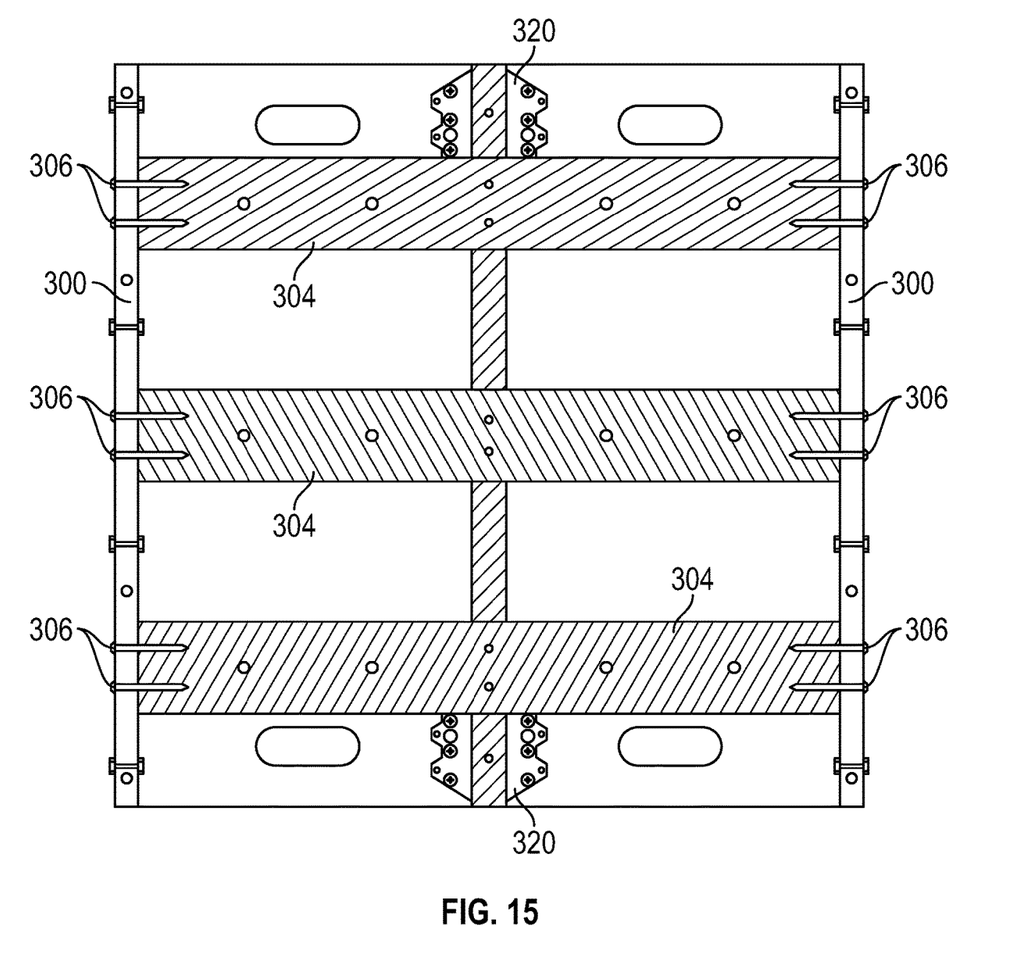
Figure 16:
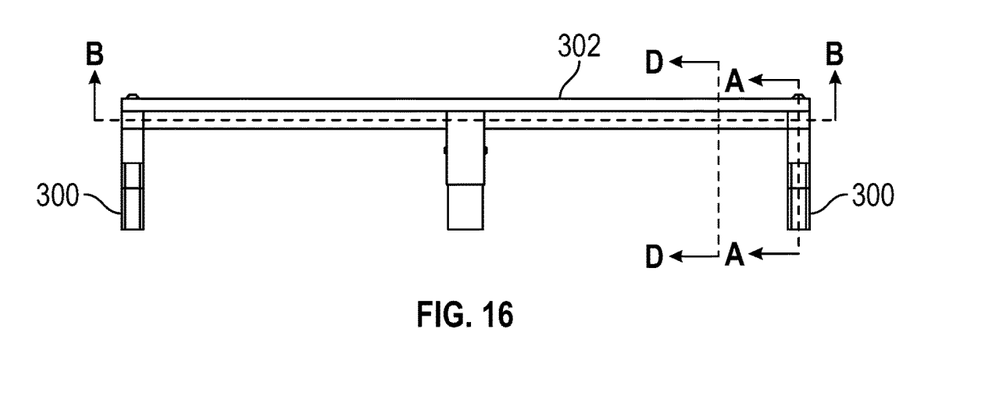

As shown in FIGS. 11 and 12, a lift assembly such as pallet jack 210 is used to lift and transport the convertible pallet and product received thereon. Particularly, arms 212, 214 are received through the respective openings 120, 122 of the convertible pallet 100. The arms 212, 214 are partially received through the openings 120, 122 of the pallet 100 in FIG. 11, and advanced fully therethrough as illustrated in FIG. 12. Movement of handle 216 raises the arms 212, 214 and thus lifts and mobilizes the convertible pallet 100 and the product 200 received thereon as desired.

Figure 17:
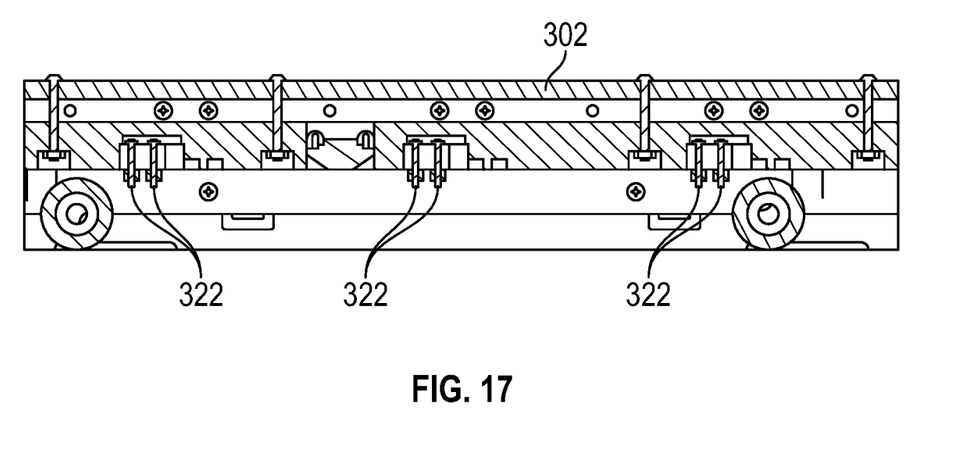
Figure 18:
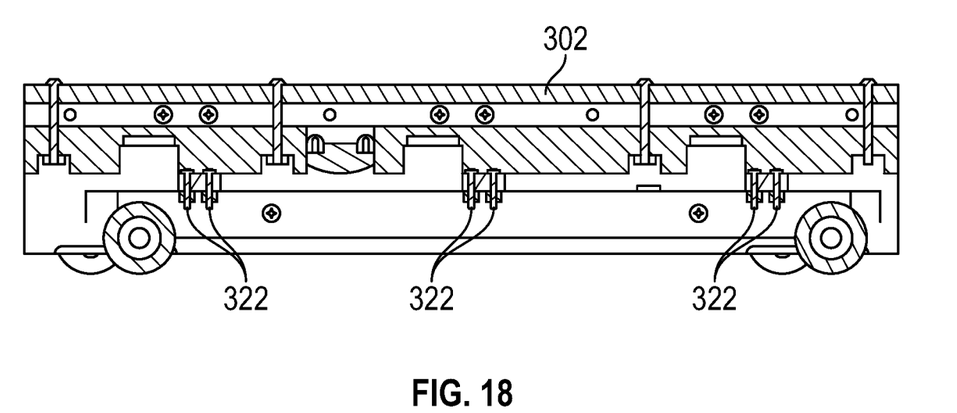
Figure 19:
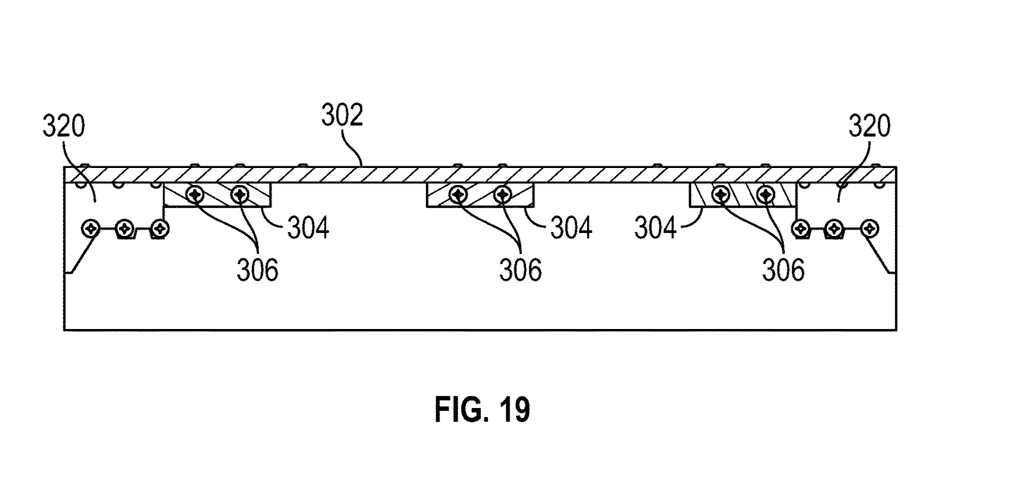
Figure 20:
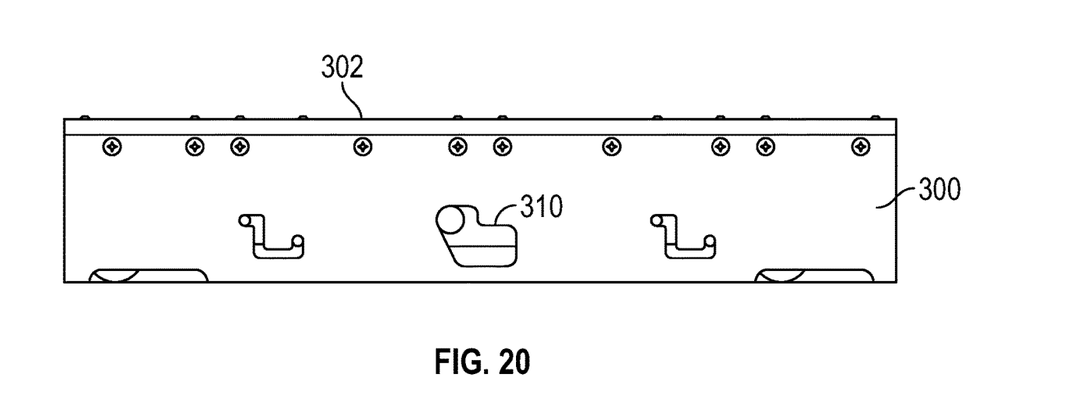

FIGS. 13-20 show modifications to the pallet that address certain features that may be desired. For example, bottom slats have been eliminated in this embodiment. In this manner, there is nothing that the pallet jack will have to drive over. The elimination of the bottom slats provides easier access and removal of the pallet jack when the wheels are down (FIG. 18). As a result of removing the bottom slats, modifications to the side slats were so that the side slats 300 and/or top decking 302 would not bow out under the load. This was accomplished by securing the top of the side slat 300, just under the decking 302, with a board 304 that is wedged into place (FIGS. 13 and 15) and secured with fasteners such as screws 306.

Another feature is that an enlarged cut-out 310 in the side of the pallet is provided so that a user cannot inadvertently get a finger or an object caught or pinched when converting the pallet from a pallet configuration (wheels up—FIG. 17) to a dolly (to wheels down—FIG. 18). There is no shear point to where the round hole, which is on the part of the assembly that is moving, can intersect or go behind the large cut out 310, which is stationary, i.e., no guillotine type action.

A rigid protection member such as a common joist hanger 320 (FIGS. 13-15) was also added to protect the end face of the intermediate support.

A comparison of FIGS. 17 and 18 also shows how the fasteners or bolt heads 322 also act as a lock mechanism to keep the assembly from inadvertently shifting once positioned in place.

This written description uses examples to describe the disclosure, including the best mode, and also to enable any person skilled in the art to make and use the disclosure. Other examples that occur to those skilled in the art are intended to be within the scope of the invention if they have structural elements or process steps that do not differ from the same concept, or if they include equivalent structural elements or process steps with insubstantial differences.

It is claimed:
1. A convertible pallet assembly comprising:
a first, planar pallet surface;
a second, planar support surface;
first and second sidewalls extending between the pallet surface and the support surface from adjacent opposite sides thereof, the sidewalls disposed in parallel relation to one another and each sidewall includes at least first and second wheels with respective rotational axes that extend perpendicular to the sidewalls; and an actuation mechanism operatively associated with each sidewall, the actuation mechanism having (i) a first position that allows the first and second wheels on one side to move upwardly and downwardly relative to the sidewall in a non-load carrying condition, and (ii) a second position such that the first and second wheels on the one side project outwardly from the support surface in a load carrying condition whereby the assembly can be rolled on the wheels as a cart, wherein the first and second wheels of the first sidewall are interconnected and thereby move together upwardly and downwardly relative thereto, and further wherein the first and second wheels of the second sidewall are interconnected and thereby move together upwardly and downwardly relative thereto, and move upwardly and downwardly independent of the first and second wheels of the first sidewall.

2. The pallet assembly of claim 1 wherein the first and second wheels of the second sidewall are interconnected and thereby move together upwardly and downwardly relative thereto.

3. The pallet assembly of claim 1 wherein the pallet surface and the support surface are spaced apart by a predetermined dimension adapted to receive associated arms of an associated pallet jack or associated forklift.

4. The pallet assembly of claim 1 wherein the actuation mechanism includes an interconnecting member joining the first and second wheels on each side.

5. The pallet assembly of claim 4 wherein the interconnecting member is configured to slide fore and aft relative to the respective sidewall.

6. The pallet assembly of claim 5 wherein the interconnecting member is configured to slide upwardly and downwardly relative to the support surface.

7. The pallet assembly of claim 6 wherein the interconnecting member includes at least one raised surface extending outwardly therefrom that selectively engages a projecting surface operatively associated with the pallet surface, the raised surface and the projecting surface spaced from one another in the first position of the actuation mechanism, and abutting one another in the second position of the actuation mechanism.

8. The pallet assembly of claim 1 wherein each sidewall includes first and second wall portions forming a cavity therebetween that receives the first and second wheels on a respective side.

9. A convertible pallet assembly comprising:
a first, planar pallet surface;
a second, planar support surface;
first and second sidewalls extending between the pallet surface and the support surface from adjacent opposite sides thereof, the sidewalls disposed in parallel relation to one another and each sidewall includes at least first and second wheels with respective rotational axes that extend perpendicular to the sidewalls; and
an actuation mechanism operatively associated with each sidewall, the actuation mechanism having (i) a first position that allows the first and second wheels on one side to move upwardly and downwardly relative to the sidewall in a non-load carrying condition, and (ii) a second position such that the first and second wheels on the one side project outwardly from the support surface in a load carrying condition whereby the assembly can be rolled on the wheels as a cart, wherein the actuation mechanism includes an interconnecting member joining the first and second wheels on each side, the interconnecting member is configured to slide fore and aft relative to the respective sidewall and also slide upwardly and downwardly relative to the support surface upwardly and downwardly relative to the support surface, and the interconnecting member further includes at least one raised surface extending outwardly therefrom that selectively engages a projecting surface operatively associated with the pallet surface, the raised surface and the projecting surface spaced from one another in the first position of the actuating mechanism, and abutting one another in the second position of the actuating mechanism; and
a recess that receives the raised surface in the first position of the actuation mechanism.

10. The pallet assembly of claim 9 wherein each actuation mechanism includes a cam and a follower that is interposed between the pallet surface and the first and second wheels.

11. The pallet assembly of claim 10 wherein the cam is provided on one of the pallet surface and the sidewall, and the follower is provided on the interconnecting member.

12. The pallet assembly of claim 11 wherein the cam is a face cam having a generally L-shaped slot formed by first and second portions in which the first portion extends between the pallet surface and the support surface, and the second portion extends generally parallel to the support surface.

13. The pallet assembly of claim 12 wherein the cam surface further includes first and second detents at distal ends of the first portion and second portion, respectively.

14. A method of making a convertible pallet assembly comprising:
providing a first, planar pallet surface;
providing a second, planar support surface;
joining the pallet surface to the support surface with first and second sidewalls extending therebetween, wherein each sidewall includes at least first and second wheels;
interconnecting the first and second wheels of the first sidewall to move together upwardly and downwardly relative to the first sidewall;
interconnecting the first and second wheels of the second sidewall to move together upwardly and downwardly relative to the second sidewall, and move upwardly and downwardly independent of the first and second wheels of the first sidewall; and
moving the first and second wheels between (i) a first position that allows the first and second wheels on one side to move upwardly and downwardly relative to the sidewall in a non-load carrying condition, and (ii) a second position such that the first and second wheels on the one side project outwardly from the support surface in a load carrying condition whereby the assembly can be rolled on the wheels as a cart.

* * * * *